(12) United States Patent
Dunham et al.

(10) Patent No.: US 8,549,831 B2
(45) Date of Patent: Oct. 8, 2013

(54) SYSTEMS AND METHODS FOR TOOL-LESS RETRACTABLE STORAGE OF LENGTHS OF CABLE CHAIN

(75) Inventors: John M. Dunham, Kechi, KS (US); Alan T. Pfeifer, Wichita, KS (US)

(73) Assignee: LSI Corporation, San Jose, CA (US)

( * ) Notice: Subject to any disclaimer, the term of this patent is extended or adjusted under 35 U.S.C. 154(b) by 250 days.

(21) Appl. No.: 13/156,157

(22) Filed: Jun. 8, 2011

(65) Prior Publication Data
US 2012/0311990 A1  Dec. 13, 2012

(51) Int. Cl.
*F16G 13/16* (2006.01)

(52) U.S. Cl.
USPC .......... 59/78.1; 59/93; 59/78; 248/49; 248/51

(58) Field of Classification Search
USPC .............................. 59/78, 78.1, 93; 248/49, 51
See application file for complete search history.

(56) References Cited

U.S. PATENT DOCUMENTS

| | | | |
|---|---|---|---|
| 4,392,344 A | 7/1983 | Gordon et al. | |
| 6,374,589 B1 | 4/2002 | Kunert et al. | |
| 6,481,195 B1 | 11/2002 | Blase | |
| 6,787,702 B2 | 9/2004 | Suzuki | |
| 7,484,351 B2 | 2/2009 | Harada et al. | |
| 7,552,581 B1 | 6/2009 | Pfeifer et al. | |
| 7,735,309 B2 | 6/2010 | Jostmeier et al. | |
| 7,984,605 B2 * | 7/2011 | Pfeifer et al. | 59/78.1 |
| 2006/0042175 A1 | 3/2006 | Crespi | |
| 2010/0058728 A1 | 3/2010 | Pfeifer et al. | |

* cited by examiner

*Primary Examiner* — David B Jones
(74) *Attorney, Agent, or Firm* — Duft Bornsen & Fettig LLP

(57) ABSTRACT

Devices and systems for tool-less assembly of cable chains that are capable of being retractably stored. The device comprises a first contact element, a second contact element, and a lengthwise member. The first contact element is adapted for movable contact with a receiving member of a first cable chain segment. The second contact element is adapted for movable contact with a receiving member of a second cable chain segment. The lengthwise member is fixedly attached to the contact elements. When an angle between the first and the second cable chain segments is a first value, the lengthwise member experiences elastic deformation, generating a spring force at each contact element sufficient to pull the receiving member of the first cable chain segment rotatably towards the receiving member of the second cable chain segment, thereby reducing the angle between the first and the second cable chain segments to a second value.

18 Claims, 8 Drawing Sheets

CLIPS CONNECT ADJACENT SEGMENTS

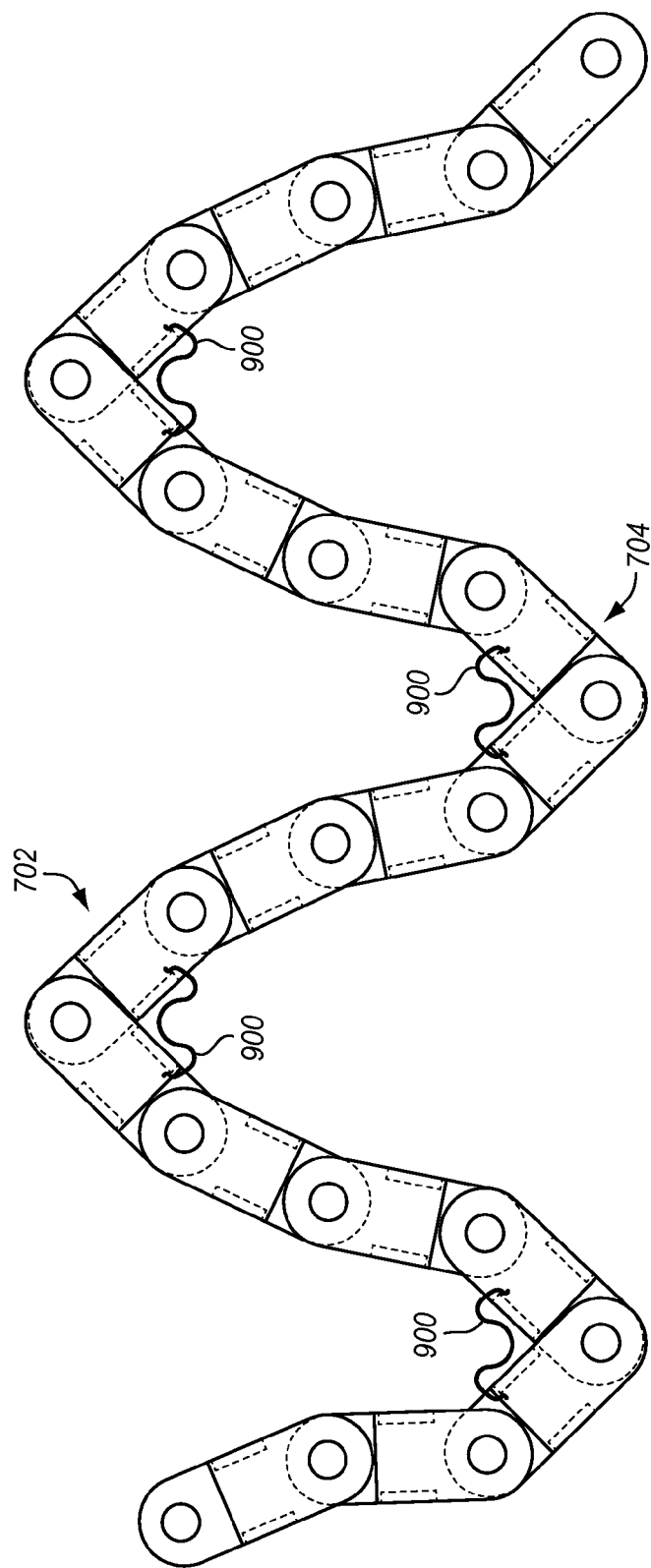
FIG. 14 CLIPS CONNECT ADJACENT SEGMENTS

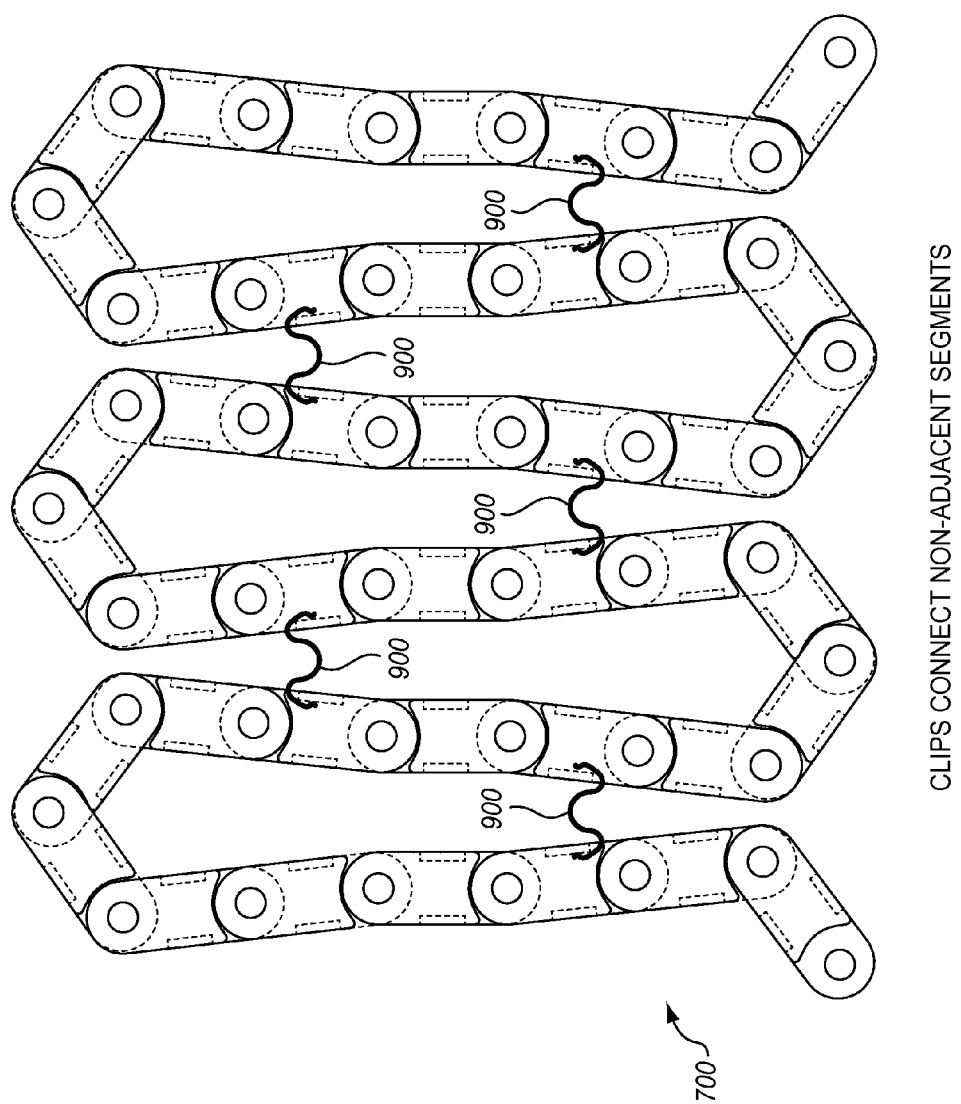

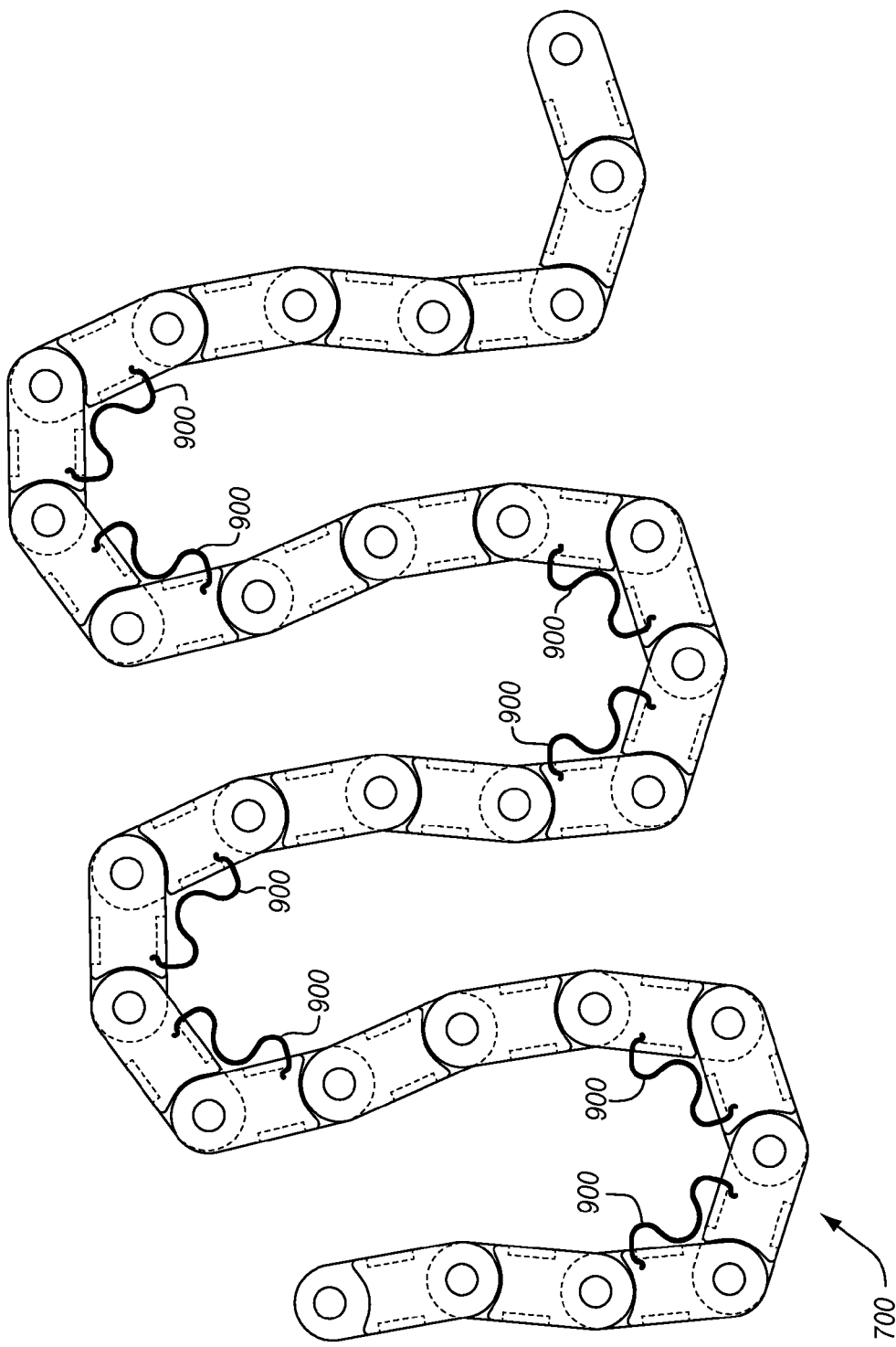
MULTIPLE CLIPS PER BEND  FIG. 16

SYSTEMS AND METHODS FOR TOOL-LESS RETRACTABLE STORAGE OF LENGTHS OF CABLE CHAIN

BACKGROUND

1. Field of the Invention

The invention relates generally to systems for configuring cable in a movable cable chain and more specifically relates to retrievably storing cable chain in a compact format.

2. Discussion of Related Art

Cable chains (also known as drag chains, energy chains, and cable carriers) comprise flexible, segmented housings used to surround and guide cables that interconnect machinery and devices. Cable chains restrict the available range of motion of the cable(s) that they house, and further typically restrict a cable to substantially coplanar motion. In addition to the obvious benefit of maintaining order among a group of cables, such restricted movement of cables is generally desirable because if a cable is "kinked" or bent at too small of a radius of curvature, the cable may experience a degradation of signal quality, or may even fail entirely. By preventing cable motion that is undesirable (e.g., tangles, kinks, etc.), the cable chain thereby increases the reliability and durability of a given cable connection.

One application of cable chains is in the field of data storage systems. A storage network may comprise tens, hundreds, or even thousands of individual storage devices interconnected with storage controllers, host bus adapters, expanders, and host devices. In one exemplary configuration of storage systems, storage devices may be housed in blade drives/enclosures configured as swappable Customer Replaceable Units (CRUs), each CRU attached to a shelf in a rack. Such configurations may utilize numerous cables—cables that may couple individual storage devices and support electronics to a blade, cables that couple drive blades to other components in a rack, cables that interconnect racks of storage devices, etc. Because each storage system will often comprise various combinations of hardware and devices, it is not uncommon for storage systems to utilize cable chains to guide and protect the various interconnections. For example, cable chains may be used to guide/constrain inter-connection cables between drive blades and other components coupled within a rack, so that the blades may be more easily removed from and inserted into the rack.

Storage systems are typically configured to allow for reconfiguration via the insertion and removal of various storage system components. Additionally, storage systems are preferably designed to allow a field engineer or operator to access the hardware of the storage system in order to perform routine maintenance or to alter the configuration of the storage system. Unfortunately, it is often a complicated process to assemble or manufacture cable chains that have a shape memory allowing for easy access to hardware. Systems or devices that impart a shape memory onto a cable chain typically must be installed onto the cable chain itself utilizing specialized tools or other devices, thereby increasing the complexity (and therefore expense) of the final product.

Thus it is an ongoing challenge to create retractable cable chains that are simpler to manufacture and configure than existing designs.

SUMMARY

The present invention solves the above and other problems, thereby advancing the state of the useful arts, by providing devices and systems for retractably storing lengths of cable chain. By combining tool-less spring clips with lengths of cable chain, a manufacturer may instill a shape memory into the cable chain. For example, spring clips may be inserted into the cable chain so that the cable chain retracts into a folding series of alternating "S" curves. Each spring clip may be configured for tool-less insertion and removable attachment to the cable chain itself. The spring clips may be configured to undergo elastic deformation when the cable chain is extended. This elastic deformation generates a spring force between segments of the cable chain that is sufficient to return the cable chain to its retracted shape. Thus, the cable chain itself may be easily assembled, even if the cable chain is designed for retractably returning into a complex shape. Furthermore, a field engineer may easily alter the shape memory of the cable chain by adding or removing spring clips from the chain. This may be desirable in customized storage systems.

In one aspect hereof, a spring clip is provided comprising a first contact element, a second contact element, and a lengthwise member. The first contact element is adapted for movable contact with a receiving member of a body of a first cable chain segment. The second contact element is adapted for movable contact with a receiving member of a body of a second cable chain segment. The lengthwise member has a first extremity fixedly attached to the first contact element, and a second extremity fixedly attached to the second contact element. When an angle between the first and the second cable chain segments is a first value, the lengthwise member experiences elastic deformation that generates a spring force at each contact element sufficient to pull the receiving member of the first cable chain segment rotatably towards the receiving member of the second cable chain segment, thereby reducing the angle between the first and the second cable chain segments to a second value.

Another aspect hereof provides a cable chain capable of returnably contracting into a compact form. The cable chain comprises a plurality of cable chain segments, wherein each cable chain segment comprises a body adapted to house a length of cable. The body of each cable chain segment further comprises a receiving member, and each cable chain segment is connected for rotational movement with respect to another cable chain segment. The cable chain further comprises a plurality of spring clips. Each spring clip comprises a first contact element in movable contact with a receiving member of a first cable chain segment, and a second contact element in movable contact with a receiving member of a second cable chain segment. Each spring clip further comprises a lengthwise member having a first extremity fixedly attached to the first contact element, and having a second extremity fixedly attached to the second contact element. When an angle between the first and the second cable chain segments is a first value, the lengthwise member experiences elastic deformation that generates a spring force at each contact element sufficient to pull the receiving member of the first cable chain segment rotatably towards the receiving member of the second cable chain segment, thereby reducing the angle between the first and the second cable chain segments to a second value.

BRIEF DESCRIPTION OF THE DRAWINGS

FIG. 14 is a diagram illustrating an exemplary cable chain in a retracted arrangement in accordance with features and aspects hereof.

FIG. 15 is a diagram illustrating a further exemplary cable chain in a retracted arrangement in accordance with features and aspects hereof.

FIG. 16 is a diagram illustrating a further exemplary cable chain in a retracted arrangement in accordance with features and aspects hereof.

DETAILED DESCRIPTION OF THE DRAWINGS

The following embodiments address existing issues with retractably storing lengths of cable chain by providing tool-less elastically deformable spring clips that may be inserted and removably coupled with a cable chain, thereby providing the cable chain with a shape memory that allows it to extend and to automatically return to a retracted arrangement. Thus, a cable chain may provide a customized shape memory without any need to use tools. Additionally, the following spring clip and cable chain arrangements allow for a field engineer to more easily instill a new shape memory in a cable chain by hand and on-the-fly.

Figure 1:
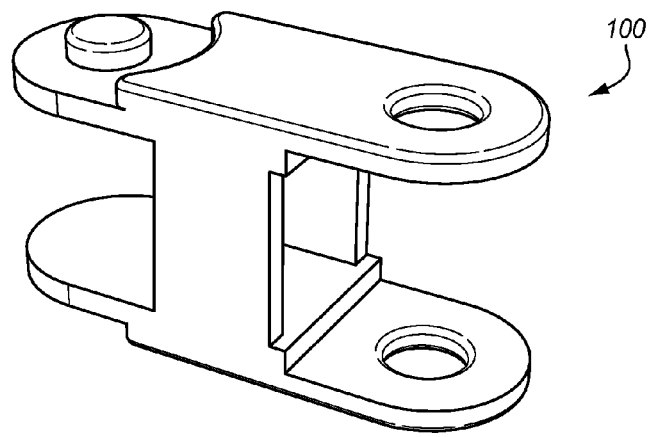
FIGS. 1-4 are diagrams illustrating top, front, side, and perspective views of an exemplary cable chain segment in accordance with features and aspects hereof.
Figure 2:
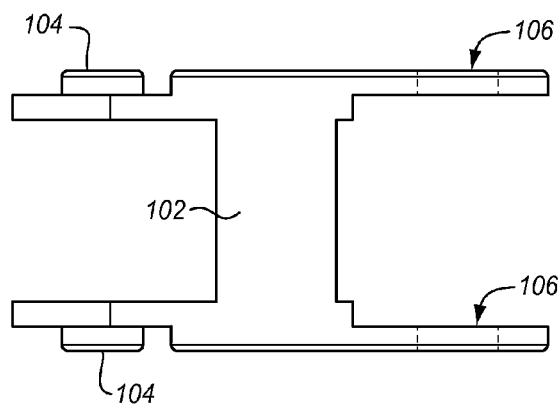
Figure 3:
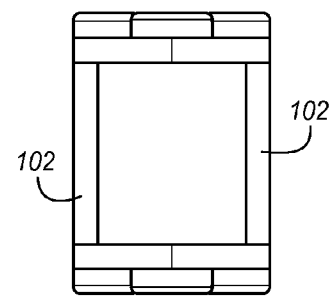
Figure 4:
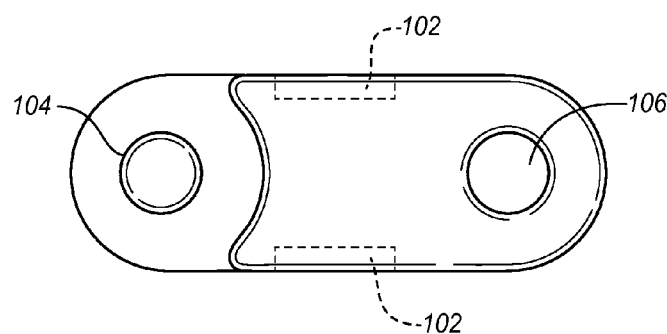

FIGS. 1-4 are diagrams illustrating top, front, side, and perspective views of an exemplary cable chain segment 100 in accordance with features and aspects hereof. In particular, FIG. 1 illustrates a perspective view of segment 100, while FIG. 2 illustrates a top view, FIG. 3 illustrates a front view, and FIG. 4 illustrates a side view. In this embodiment, segment 100 comprises a housing body having an interior portion through which a length of cable may be housed. The housing body may comprise one or more lateral members, and each lateral member may define a plane substantially parallel to the lengthwise axis of the cable residing in the housing body. Part of the body of segment 100 comprises receiving members 102, which are adapted to receive an end of a spring clip (e.g., receiving members 102 may be aligned to receive a spring clip, and may comprise features such as detents, holes, or other similar means for limiting the motion of the spring clip once it has been coupled with segment 100). Further, segment 100 comprises elements designed for rotatable coupling about other cable chain segments. For example, segment 100 comprises male adapters 104 and female adapters 106 for coupling with other cable chain segments.

One of ordinary skill in the art will appreciate that countless different makes, models, and types of cable chain segments may be used in the present invention, and will further appreciate that different cable chains may include various other features or methods of connecting with one another, which, for the sake of brevity, have not been shown at FIGS. 1-4.

Figure 5:
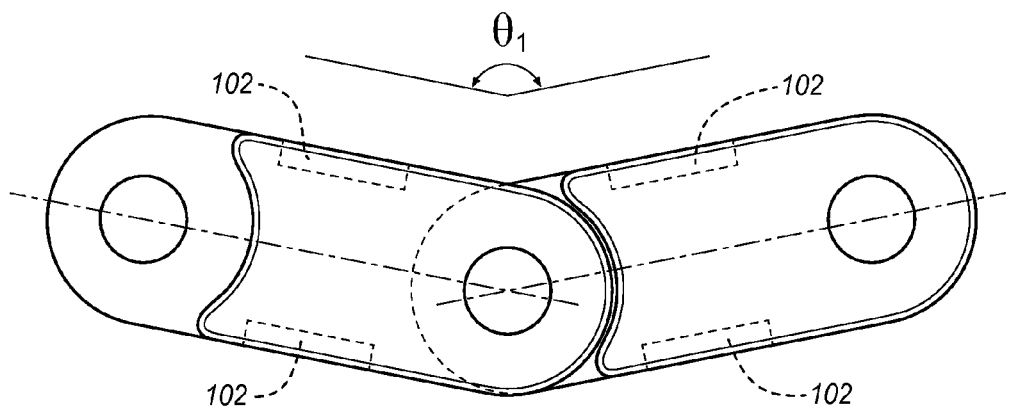
FIGS. 5-6 are diagrams illustrating two exemplary segments of a cable chain, rotatably coupled with each other in accordance with features and aspects hereof.
Figure 6:
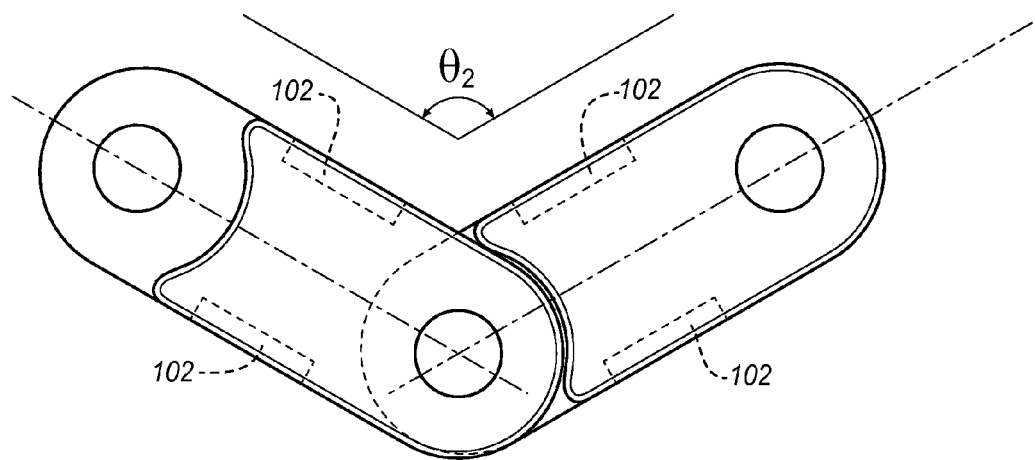

FIGS. 5-6 are diagrams illustrating two exemplary segments of a cable chain, rotatably coupled with each other in accordance with features and aspects hereof. In one embodiment, a male adapter of a first cable chain segment is hinged or otherwise rotatably coupled with a female adapter of a second cable chain segment. According to FIGS. 5-6, the rotatable connection between the cable chain segments defines an angle of intersection $\theta$ (hereinafter also referred to by the phrase "the angle between the cable chain segments"). Cable chain segments will often be restricted in motion such that all segments of a cable chain are substantially kept within the same plane (e.g., the hinging action or other restrictive structures may substantially restrict the movements of the cable chain segments to a single plane relative to one another). In such embodiments, the angle $\theta$ will typically be measured as the angle between the cable chain segments along this plane. Note that because the cable chain segments are rotatably coupled with respect to each other, the angle $\theta$ may vary. Thus, $\theta_1$ of FIG. 5 corresponds to a larger angle than does $\theta_2$ of FIG. 6. Furthermore, the angle $\theta$ may be restricted to a maximum and a minimum angle, based upon mechanical stops that limit the range of rotation for the cable chain segments. For example, receiving members 102 or other elements of the housing body of a cable chain segment may have a geometry that defines a maximum and minimum angle between cable chain segments. In another example, elements used for rotatable coupling with other cable chain segments may limit the maximum and minimum allowable angle between cable chain segments. It is generally preferable to have a maximum and minimum allowed angle of intersection between two cable chain segments, because these values limit the amount of "kinking" that may occur at the cable that is housed within the cable chain segments. When the cable chain segments have a geometry that defines a minimum angle $\theta$, it will be appreciated that the geometry of the cable chain (comprising a plurality of cable chain segments) also defines a minimum radius of curvature for the cable chain (and the cable residing therein).

Figure 7:
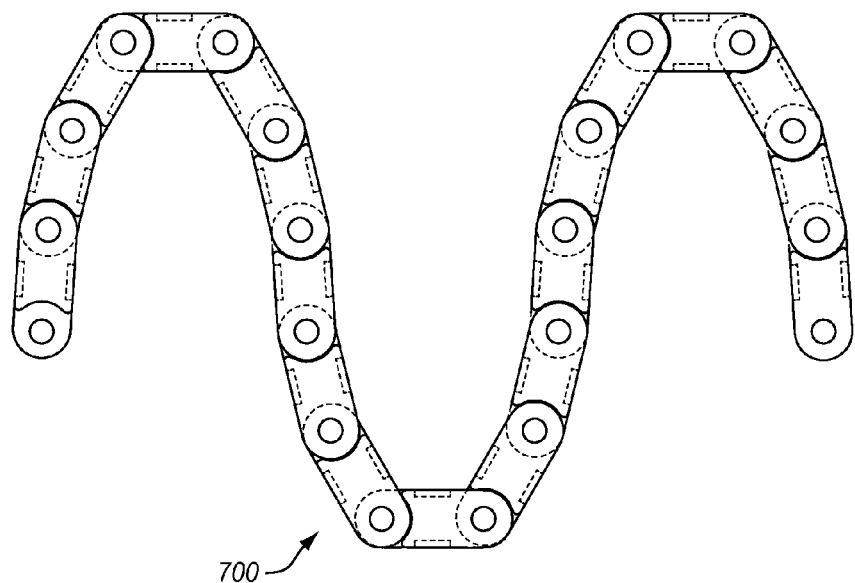
FIGS. 7-8 are diagrams illustrating an exemplary length of cable chain formed in accordance with features and aspects hereof, the chain depicted in a retracted and an extended configuration.
Figure 8:
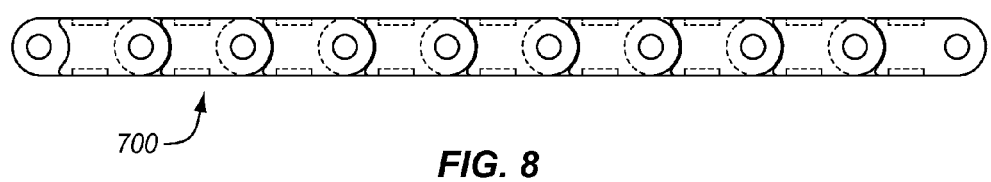

FIGS. 7-8 are diagrams illustrating an exemplary length of cable chain 700 formed in accordance with features and aspects hereof, wherein chain 700 is depicted in a retracted and an extended configuration. Cable chain 700 may comprise multiple cable chain segments (e.g., multiple copies of cable chain segment 100 of FIG. 1). In FIG. 7, cable chain 700 is in a retracted arrangement, while in FIG. 8, cable chain 700 is in an extended arrangement. With various embodiments of exemplary lengths of cable chain having been discussed as above, a spring clip will now be described for use with cable chains so as to allow a cable chain to be extended, yet to also elastically return the cable chain to a retracted configuration after being extended.

Figure 9:
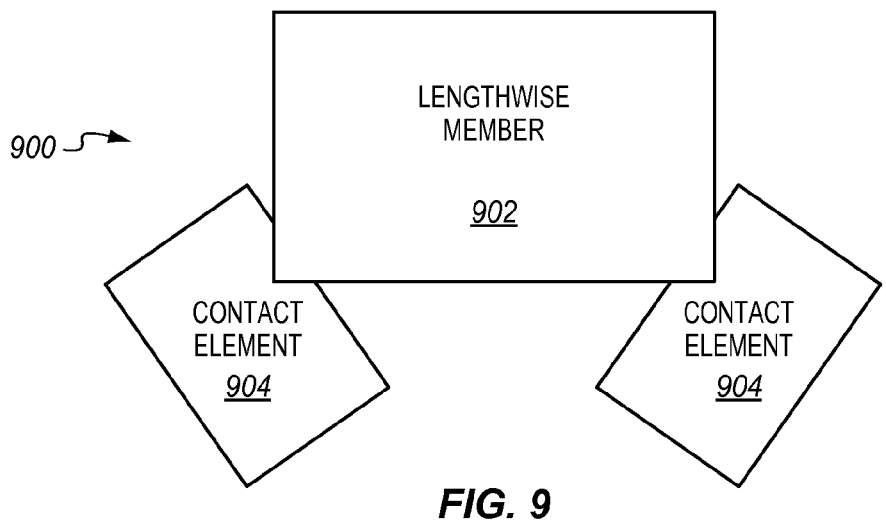
FIG. 9 is a block diagram of an exemplary spring clip in accordance with features and aspects hereof.

FIG. 9 is a block diagram of an exemplary spring clip 900 in accordance with features and aspects hereof Spring clip 900 comprises lengthwise member 902 having extremities fixedly attached to multiple contact elements 904. Each contact element 904 is adapted for being placed into movable contact with a receiving member of a cable chain (e.g., a receiving member 102 of cable chain segment 100). For example, contact elements 904 may comprise a rubber surface to limit sliding when in contact with a receiving member of a cable chain segment. Furthermore, contact elements 904 are dimensioned such that a first contact element 904 may be placed in contact with one cable chain segment, while a second contact element 904 may be placed in contact with another cable chain segment. In one embodiment, contact elements 904 include end portions that are curved outward to allow contact elements 904 to more easily slide onto receiving members of a cable chain. In some embodiments, contact elements 904 comprise hooks, clips for "snapping" or sliding onto a segment of cable chain, elements of a ball-and-socket joint, magnetic elements for coupling with cable chain segments, or others. Contact elements 904 may comprise any well-known solid material, and will preferably be strong enough to withstand spring forces applied by lengthwise member 902. Lengthwise member 902 comprises any suitable materials and/or designs capable of experiencing elastic deformation along the length of spring clip 900. For example, lengthwise member 902 may comprise a curvilinear spring, coiled spring, a linear elastomer, or other device. Furthermore, lengthwise member 902 may comprise a steel alloy, an elastomer, an elastic plastic, or other material capable of experiencing elastic deformation and known to one of ordinary skill in the art. Extremities of lengthwise member 902 are fixedly attached to contact elements 904, and may be part of the same molded piece of material as contact elements 904. In one embodiment, extremities of lengthwise member 902 are screwed, clipped, welded, or inserted into contact elements 904.

Figure 10:
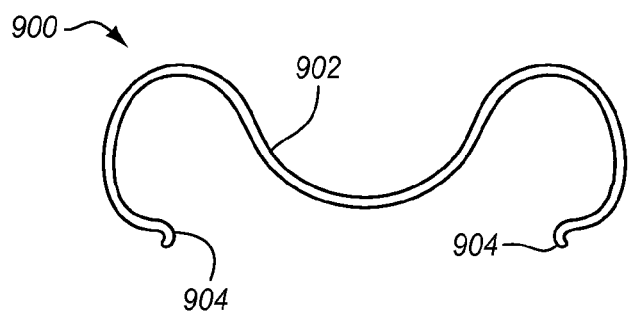
FIG. 10 is a diagram of an exemplary spring clip in accordance with features and aspects hereof.

FIG. 10 is a diagram of an exemplary spring clip 900 in accordance with features and aspects hereof. In this embodiment, spring clip 900 comprises a curvilinear steel alloy spring, and contact elements 904 comprise further steel alloy components for movably coupling to a receiving member of a cable chain segment.

Figure 11:
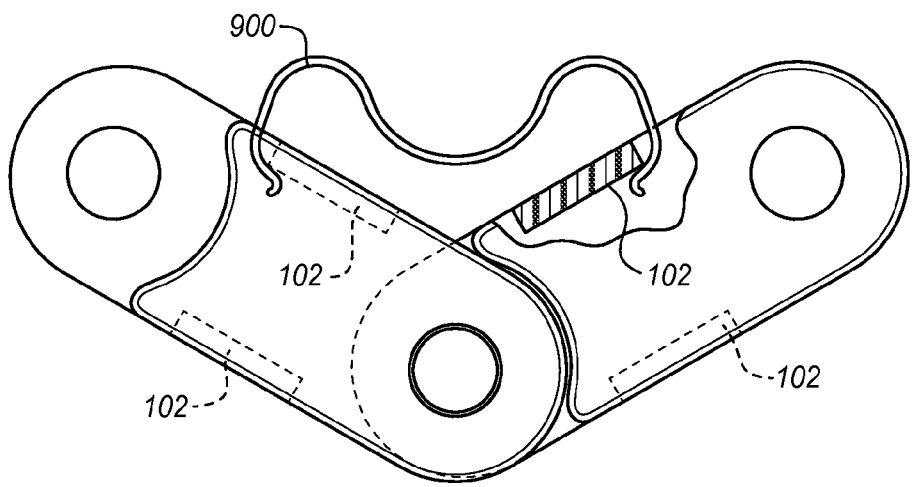
FIG. 11 is a diagram of an exemplary spring clip connected for tool-less insertion and/or removal from two exemplary segments of cable chain in accordance with features and aspects hereof.

FIG. 11 is a diagram of an exemplary spring clip 900 connected for tool-less insertion and/or removal from two exemplary segments of cable chain in accordance with features and aspects hereof. In this embodiment, a "cut-out" has been provided at the right cable chain segment, to illustrate how spring clip 900 may couple with receiving elements 102. Note that in this embodiment, contact elements of spring clip 900 are placed in movable contact with bottom surfaces of receiving members 102 (i.e., the contact elements are placed in movable contact with inward-facing surfaces of the receiving members 102).

Figure 12:
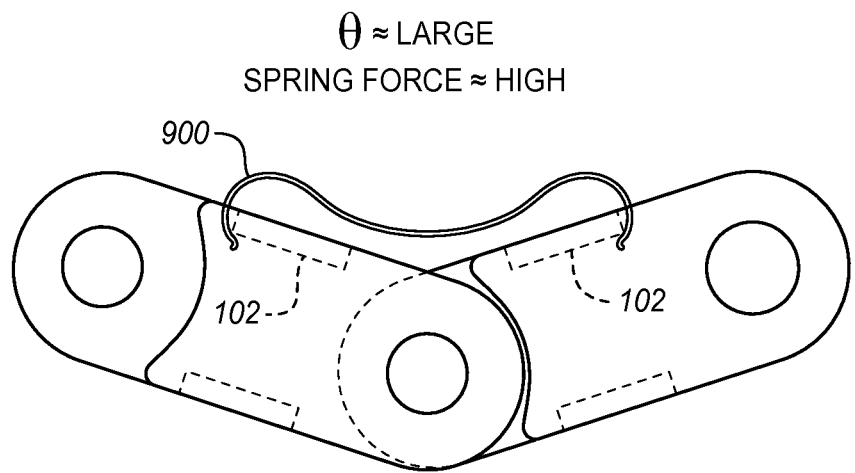
FIGS. 12-13 are diagrams of an exemplary spring clip experiencing elastic deformation to alter an angle between two exemplary segments of cable chain in accordance with features and aspects hereof.
Figure 13:
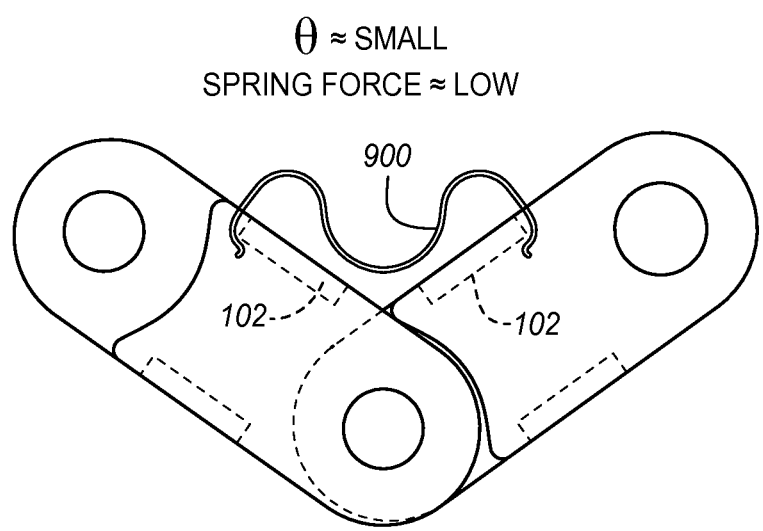

FIGS. 12-13 are diagrams of an exemplary spring clip 900 experiencing elastic deformation to alter an angle θ between two exemplary segments of cable chain in accordance with features and aspects hereof. FIG. 12 illustrates cable chain segments in an extended configuration, wherein θ is large. In such circumstances, spring clip 900 experiences elastic deformation, and applies a relatively large spring force to press contact elements of spring clip 900 against receiving members 102 of the cable chain segments. This spring force pulls receiving members 102 rotatably towards each other, thereby reducing the angle between the cable chain segments. FIG. 13 illustrates a coupling wherein spring clip 900 has reduced the angle θ to a smaller value. This smaller value may be the minimum angle mechanically allowed between the two cable chain segments, or may be larger, depending on the nature of the cable chain segments. In this configuration, spring clip 900 is restored to a substantially resting position, wherein it generates relatively little or no spring force. It may be beneficial for spring clip 900 to generate some small amount of spring force, even when the cable chain segments are at a minimum angle of intersection, in order to press contact elements of spring clip 900 against receiving members of the cable chain segments, thereby holding the first and second contact elements in place on the cable chain segments. Thus, even at a small angle of intersection, spring clip 900 may "pinch" or "grip" onto receiving members 102.

Note that it will be generally desirable that spring clips 900 generate a large enough spring force when deformed that they may return a cable chain to a retracted form. At the same time, it is also desirable that spring clips 900 have an elastic modulus low enough that they may be elastically deformed and added to/removed from the cable chain by hand.

EXAMPLES

In the following examples, additional processes, systems, and methods are described in the context of a cable chain 700 having a plurality of segments coupled with a plurality of spring clips 900.

FIG. 14 is a diagram illustrating an exemplary cable chain 700 in a retracted arrangement in accordance with features and aspects hereof. In this embodiment, cable chain 700 has segments that are coupled with spring clips 900, and cable chain 700 is restricted to substantially coplanar motion. In this embodiment, cable chain 700 has a top surface 702, and a bottom surface 704. The plane of motion for cable chain 700 may be defined as a plane that is perpendicular to the planes defined by top surface 702 and bottom surface 704. Spring clips may be alternatingly placed into contact with top surface 702 and bottom surface 704 in order to fold cable chain 700 into lengths of chain. In this embodiment, when retracted into lengths of chain, cable chain 700 forms a substantially "pleated" arrangement of alternating folding curves.

FIG. 15 is a diagram illustrating a further exemplary cable chain 700 in a retracted arrangement in accordance with features and aspects hereof. This embodiment is similar to FIG. 14 described above. However, in this embodiment, spring clips 900 do not couple cable chain segments that are directly rotatably attached to each other, but rather couples cable chain segments that are not directly adjacent.

FIG. 16 is a diagram illustrating a further exemplary cable chain 700 in a retracted arrangement in accordance with features and aspects hereof. According to FIG. 16, multiple spring clips 900 are used to generate each "kink," "pleat," "bend," or "fold" in cable chain 700. Using multiple spring clips per bend may be particularly helpful when neighboring segments of cable chain 700 have geometries that only allow for incremental changes in cable direction.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A spring clip for holding a cable chain in a compact form, the spring clip comprising:
    a first contact element adapted for movable contact with a receiving member of a body of a first cable chain segment;
    a second contact element adapted for movable contact with a receiving member of a body of a second cable chain segment; and
    a lengthwise member having a first extremity fixedly attached to the first contact element, and having a second extremity fixedly attached to the second contact element,
    wherein the first contact element is adapted for movable contact with a bottom surface of the receiving member of the first cable chain segment, wherein the bottom surface of the receiving member of the first cable chain segment faces an inward portion of the first cable chain segment, and wherein the second contact element is adapted for movable contact with a bottom surface of the receiving member of the second cable chain segment, wherein the bottom surface of the receiving member of the second cable chain segment faces an inward portion of the second cable chain segment.

2. The spring clip of claim 1,
wherein when an angle between the first and the second cable chain segments is a first value, the lengthwise member experiences elastic deformation that generates a spring force at each contact element sufficient to pull the receiving member of the first cable chain segment rotatably towards the receiving member of the second cable chain segment, thereby reducing the angle between the first and the second cable chain segments to a second value.

3. The spring clip of claim 2,
wherein the second value for the angle is a minimum angle allowed by the geometry of the first and the second cable chain segments,
wherein the angle defines a radius of curvature for a cable residing in the cable chain segments.

4. The spring clip of claim 2,
wherein when the angle between the first and the second cable chain segments is the second value, the lengthwise member experiences elastic deformation that generates a spring force at the contact elements sufficient to press the contact elements against the receiving members, thereby holding the first and second contact elements in place on the first and second cable chain segments, respectively.

5. The spring clip of claim 1,
wherein the lengthwise member comprises a curvilinear spring.

6. The spring clip of claim 1,
wherein the lengthwise member comprises a coiled spring.

7. The spring clip of claim 1,
wherein the lengthwise member comprises an elastomer.

8. The spring clip of claim 1,
wherein the elastic modulus of the lengthwise member is sufficiently low to allow for the spring clip to be elastically deformed and removed by human hand from the first cable chain segment and the second cable chain segment.

9. A cable chain capable of returnably contracting into a compact form, the cable chain comprising:
a plurality of cable chain segments, wherein each cable chain segment comprises a body adapted to house a length of cable, wherein each body further comprises a receiving member, and wherein each cable chain segment is connected for rotational movement with respect to another cable chain segment; and
a plurality of spring clips, each spring clip comprising:
a first contact element in movable contact with a receiving member of a first cable chain segment;
a second contact element in movable contact with a receiving member of a second cable chain segment; and
a lengthwise member having a first extremity fixedly attached to the first contact element, and having a second extremity fixedly attached to the second contact element, wherein when an angle between the first and the second cable chain segments is a first value, the lengthwise member experiences elastic deformation that generates a spring force at each contact element sufficient to pull the receiving member of the first cable chain segment rotatably towards the receiving member of the second cable chain segment, thereby reducing the angle between the first and the second cable chain segments to a second value.

10. The cable chain of claim 9,
wherein for each spring clip:
when the angle between the first and the second cable chain segments is the second value, the lengthwise member experiences elastic deformation that generates a spring force at the contact elements sufficient to press the contact elements against the receiving members, thereby holding the first and second contact elements in place on the first and second cable chain segments, respectively.

11. The cable chain of claim 10,
wherein the receiving members of the first and the second cable chain segments each comprise an integrated means for receiving a contact element and restraining the motion of the contact element.

12. The cable chain of claim 9,
wherein each of the plurality of cable chain segments further comprise mechanical stops that limit the angle between the first and the second cable chain segments to a maximum value and a minimum value,
wherein for each spring clip:
the first value corresponds to the maximum angle allowed by the mechanical stops of the first and the second cable chain segments; and
the second value corresponds to the minimum angle allowed by the mechanical stops of the first and the second cable chain segments,
wherein the angle defines a radius of curvature for the length of cable residing in the cable chain segments.

13. The cable chain of claim 9, wherein for each spring clip:
the first contact element is in movable contact with a bottom surface of the receiving member of the first cable chain segment, wherein the bottom surface of the receiving member of the first cable chain segment faces an inward portion of the first cable chain segment, and
wherein the second contact element is in movable contact with a bottom surface of the receiving member of the second cable chain segment, wherein the bottom surface of the receiving member of the second cable chain segment faces an inward portion of the second cable chain segment.

14. The cable chain of claim 9,
wherein the lengthwise member of each spring clip comprises a curvilinear spring.

15. The cable chain of claim 9,
wherein the cable chain segments of the cable chain are constrained to substantially coplanar motion.

16. The cable chain of claim 15,
wherein the cable chain comprises a top surface defining a plane orthogonal to a plane defined by the coplanar motion, and the cable chain further comprises a bottom surface defining another plane orthogonal to the plane defined by the coplanar motion,
wherein the plurality of springs clips are alternatingly placed into contact with the top surface and the bottom surface of the cable chain such that the cable chain folds into lengths of cable chain segments in a substantially pleated arrangement,
wherein for each alternation, a first number of spring clips are placed in contact with receiving members at the top surface of the cable chain, and a second number of spring clips are placed in contact with receiving members at the bottom surface of the cable chain.

17. The cable chain of claim 16,
wherein the first number is one, and the second number is one.

18. The cable chain of claim 9,
wherein the elastic modulus of the lengthwise member of each spring clip is sufficiently low to allow for the device to be elastically deformed and removed by hand from the first cable chain segment and the second cable chain segment.

* * * * *